US009081590B2

(12) United States Patent
Brown et al.

(10) Patent No.: US 9,081,590 B2
(45) Date of Patent: Jul. 14, 2015

(54) MULTIMODAL INPUT USING SCRATCHPAD GRAPHICAL USER INTERFACE TO EDIT SPEECH TEXT INPUT WITH KEYBOARD INPUT

(75) Inventors: Eric C. Brown, Seattle, WA (US); David Mowatt, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 1781 days.

(21) Appl. No.: 12/145,487

(22) Filed: Jun. 24, 2008

(65) Prior Publication Data

US 2009/0319266 A1 Dec. 24, 2009

(51) Int. Cl.
*G10L 15/00* (2013.01)
*G06F 9/44* (2006.01)
*G10L 15/22* (2006.01)

(52) U.S. Cl.
CPC .............. *G06F 9/4443* (2013.01); *G10L 15/22* (2013.01)

(58) Field of Classification Search
CPC ... H04M 2201/40; G10L 15/24; G10L 15/32; G10L 15/265; G06F 17/211; G06F 3/0219; G06F 3/048; G06F 3/0489
USPC ............................ 345/173; 715/780; 719/318
See application file for complete search history.

(56) References Cited

U.S. PATENT DOCUMENTS

| | | | |
|---|---|---|---|
| 4,914,704 A | 4/1990 | Cole et al. | |
| 5,909,667 A | 6/1999 | Leontiades et al. | |
| 6,088,671 A | 7/2000 | Gould et al. | |
| 6,314,397 B1 | 11/2001 | Lewis et al. | |
| 7,260,529 B1 | 8/2007 | Lengen | |
| 7,263,657 B2 | 8/2007 | Soin et al. | |
| 7,315,818 B2 | 1/2008 | Stevens et al. | |
| 7,836,412 B1* | 11/2010 | Zimmerman | 715/827 |
| 2003/0028382 A1 | 2/2003 | Chambers et al. | |
| 2004/0150670 A1* | 8/2004 | Feldman et al. | 345/781 |
| 2004/0243415 A1 | 12/2004 | Commarford et al. | |
| 2005/0055647 A1* | 3/2005 | Chen | 715/827 |

(Continued)

OTHER PUBLICATIONS

Bourguet, "Towards a Taxonomy of Error-Handling Strategies in Recognition-Based Multimodal Human—Computer Interfaces", vol. 86, Issue 12, Dec. 2006, Signal Processing, Elsevier Science, pp. 32.

Suhm, et al., "Multimodal Error Correction for Speech User Interfaces", ACM Transactions on Computer—Human Interaction, vol. 8, No. 1, Mar. 2001, ACM, pp. 60-98.

Bolt, ""Put-That-There": Voice and Gesture at the Graphics Interface", ACM SIGGRAPH Computer Graphics, vol. 14, Issue 3, Jul. 1980, ACM, pp. 262-270.

*Primary Examiner* — Douglas Godbold
*Assistant Examiner* — Mark Villena
(74) *Attorney, Agent, or Firm* — Bryan Webster; Kate Drakos; Micky Minhas (57) ABSTRACT

A system and method for multimodal input into an application program. The method may include performing speech recognition on speech audio input to thereby produce recognized speech text input for insertion into a document of an application program, the document having keyboard focus. The method may also include identifying the document as being text service framework unaware. The method may further include displaying the recognized speech text input in a scratchpad graphical user interface for editing the recognized speech text input. The method may further include reflecting keyboard input bound for the document to the scratchpad graphical user interface, while preserving the keyboard focus of the document. The method may also include displaying the reflected keyboard input on the scratchpad graphical user interface, to thereby effect edits in the recognized speech text input.

16 Claims, 4 Drawing Sheets

(56) References Cited

U.S. PATENT DOCUMENTS

| | | | |
|---|---|---|---|
| 2005/0091576 A1* | 4/2005 | Relyea et al. | 715/502 |
| 2005/0091672 A1* | 4/2005 | Debique et al. | 719/328 |
| 2005/0099398 A1* | 5/2005 | Garside et al. | 345/173 |
| 2006/0041892 A1* | 2/2006 | Need | 719/318 |
| 2006/0112349 A1* | 5/2006 | Clow et al. | 715/780 |
| 2006/0161889 A1* | 7/2006 | Stabb et al. | 717/113 |
| 2007/0083366 A1 | 4/2007 | Peters | |
| 2008/0288878 A1* | 11/2008 | Hayashi et al. | 715/762 |
| 2009/0183124 A1* | 7/2009 | Sridhar et al. | 715/847 |
| 2009/0198840 A1* | 8/2009 | Marshall | 710/15 |

* cited by examiner

MULTIMODAL INPUT USING SCRATCHPAD GRAPHICAL USER INTERFACE TO EDIT SPEECH TEXT INPUT WITH KEYBOARD INPUT

BACKGROUND

Even though the accuracy of speech recognition software has improved in recent years and can allow users to dictate text, accuracy is high but still not perfect. Users therefore have a need to be able to navigate by voice to the misrecognized text and efficiently correct their mistakes. This correction activity is often achieved by selecting alternate recognitions, for example "This fish swam" instead of "These fish swam". However, this advanced correction functionality is only available for applications which use standard, basic text window controls (which few professional word processing or spreadsheet applications do) or for applications which support specialized interfaces such as Microsoft® Windows® Text Services Framework, which is complicated and as a result, many applications do not use such specialized interfaces. The result has been in many other applications that the experience of using speech recognition has been frustrating and inefficient.

SUMMARY

Systems and methods for multimodal input for use with an application program executed on a computing device are provided. The method may include performing speech recognition on speech audio input to thereby produce recognized speech text input for insertion into a document of an application program, which has keyboard focus. The method may also include identifying the document as being text service framework unaware. The method may further include displaying the recognized speech text input in a scratchpad graphical user interface for editing the recognized speech text input. The method may further include reflecting keyboard input bound for the document to the scratchpad graphical user interface, while preserving the keyboard focus of the document in the application program. The method may also include displaying the reflected keyboard input on the scratchpad graphical user interface, to thereby effect edits in the recognized speech text input.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
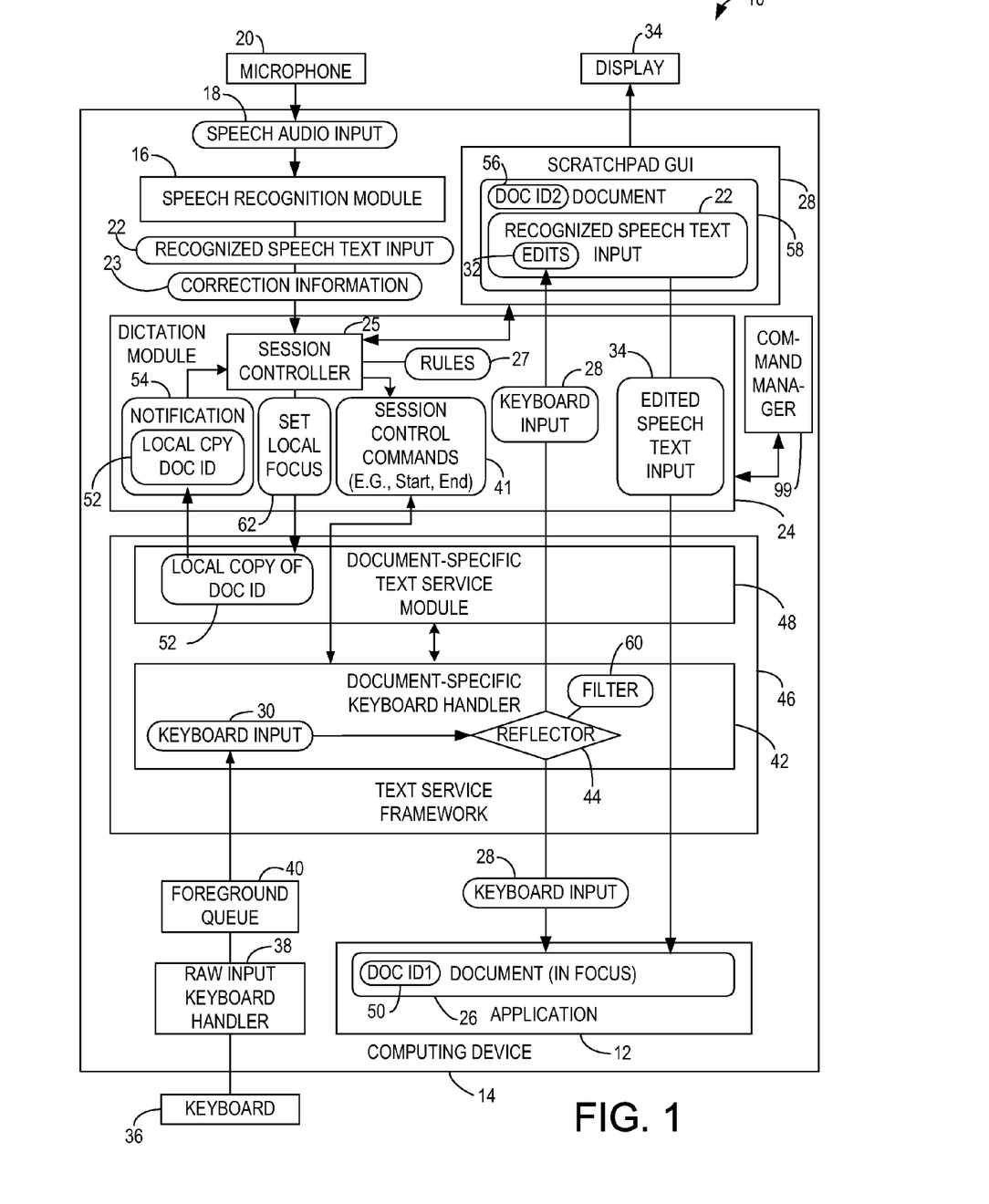
FIG. 1 is a schematic diagram illustrating an embodiment of a multimodal input system for use with an application program executed on a computing device.

FIG. 1 illustrates a system 10 for multimodal input for use with an application program 12 executed on a computing device 14. The application program may be configured to enable the user to work in one or more open documents. At any given time one of those documents is designated as a document 26 that has keyboard focus on a display of the computing device, and is thus configured to receive keyboard input 30 from the user. The document that has keyboard focus may, for example, be a topmost active window on the display.

In addition, the multimodal input system 10 may include a speech recognition module 16, which may be configured to process speech audio input 18 received from a user via microphone 20 coupled to the computing device 14.

Before audio is received, the speech recognition module 16 may also monitor which document in which application occupies the active window that has keyboard focus. The speech recognition module 16 may be configured to track with a session controller 25 changes to the active window, and also may track whether the application 12 associated with the document in focus natively supports the text service framework 46, or is text service framework unaware.

If the session controller 25 indicates that the application 12 with the document 26 occupying the active window with keyboard focus does support the text service framework 46, and if the user speaks into the microphone 20, then recognized speech text input 22 and correction information 23, which are generated from the recognized audio by the speech recognition module 16 based on the speech audio input 18, are passed to the text services framework 46 and no further processing by the dictation module 24 is undertaken. However, if the session controller 25 indicates that the application 12 with the active window having keyboard focus does not support the text service framework 46, and if the user speaks into the microphone 20, then additional processing is undertaken to ensure that the user can both dictate and efficiently correct text.

To correct differences between what the speech recognizer recognized and what the user actually said, the system 10 may include a command manager 99 and a dictation module 24. The dictation module 24 has a session controller 25 which knows which window is the active window with keyboard focus. Each possible text input control for the document associated with the active window is assigned an instance of an edit session in which the user may input or edit recognized text 22.

The system 10 may further include a scratchpad graphical user interface (GUI) 28 that can be opened by the controller 25, upon making the determination that an edit session is to be undertaken in an application which does not natively support a text services framework such as the Microsoft® Windows® Text Service Framework or other text service framework. The scratchpad GUI is configured to display the recognized speech text input 22, and to receive keyboard input 30 or voice input such as voice commands, such as "correct last sentence" to effect edits 32 in the recognized speech text input 22.

For some applications, a user might attempt a laborious workaround by switching application focus and then dictating into a second application which fully supports rich speech correction via a text services framework, and then copying the corrected text back into the first application. However, in addition to being time consuming and inconvenient, many applications closely monitor when the user switches away, specifically switching away keyboard focus, to a second application, and exhibit behaviors that can interfere with the user's work in the document of the first application.

The scratchpad GUI 28 therefore receives keyboard input 30 without changing a keyboard focus from the document 26. The scratchpad GUI 28 may further be configured to incorporate the edits 32, and generate an edited speech text input 34 for insertion into the document 26.

It will be appreciated that correction information 23 may include recorded portions of speech audio input and/or alternate recognition candidate words or phrases for a selected span of speech audio input. Thus, a user may be presented with the recorded portions of speech audio input and/or with alternate recognition candidates during the edit session, via the scratchpad graphical user interface, to enable the user to appropriately make the edits in the recognized speech text input.

Turning now to the mechanism by which keyboard input is routed to the scratchpad GUI 28, it will helpful to understand the general data flow of keyboard input 30. Initially, keyboard input 30 may be received from a keyboard 36 associated with the computing device 14. The keyboard input 30 is first processed by a raw input keyboard handler 38, and then sent to a foreground queue 40, which holds keyboard input 30 bound for the document 26 that currently has keyboard focus.

To properly route keyboard input 30 to the scratchpad GUI 28 rather than to the document 26 that has keyboard focus during edit sessions, the system 10 may further include a document-specific keyboard handler 42 including a reflector 44 configured to receive keyboard input 30 from the foreground queue 40, and selectively reflect the keyboard input 30 to the scratchpad GUI 28 for editing, according to session control commands 41 received from the dictation module 24, as discussed below.

The document-specific keyboard handler 42 may be part of a text service framework 46 configured as a component of an operating system of the computing device 14. The text service framework 46 may be configured to receive both the keyboard input 30 via the keyboard handler 42, as well as speech text input from a document-specific text service module 48. The dictation module 24 may be configured to communicate with the document-specific text service module 48, to command the keyboard handler 42 to pass commands to start and stop reflecting keyboard input to the document specific keyboard handler 42.

To keep track of the document currently in focus as the user operates computing device 14, the document-specific ext service module 48 is configured to store a local copy 52 of a document identifier of the document with which the document-specific text service module 48 is associated. The document-specific text service module 48 is further configured to send a notification 54 to the dictation module 24, through event notification or another mechanism, indicating this document identifier and also indicating whether the associated document has keyboard focus. Thus, prior to receiving the recognized speech text input 22, the dictation module 24 may be configured to receive the notification 54 from the document-specific text service module 48, which indicates that the document 26 with which the document-specific text service module 48 is associated has keyboard focus. The notification 54 also may contain a local copy 52 of the document identifier for the document in focus, which has a value of the first document identifier 50, indicating that document 26 has keyboard focus. In this manner, both the text service module and the dictation module keep track of the document that currently has keyboard focus.

The dictation module 24 may further be configured to change a value of the local copy 52 of the first document identifier 50 to be a second document identifier 56 that is associated with the scratchpad GUI 28, via a set local focus command 62. This has the effect of informing the document-specific text service module 48 that scratchpad document 58 of the scratchpad GUI has keyboard focus, without affecting the keyboard focus registered with other components of the text service framework, thereby preserving the keyboard focus of document 26. By doing so, reflected keyboard input that is received by the text service module is not sent to the document 26, but rather is passed to the dictation module 24, for display in scratchpad GUI 28. Thus, changing the value of local copy 52 of the document identifier does not actually change the keyboard focus away from the document 26, but rather results in the document specific text service module temporarily treating the scratchpad document 58 as having keyboard focus. Since the focus is not actually taken away from document 26, potential undesirable effects of taking focus away which are a result of the programming of application program 12, such as prematurely closing the text insertion point in the document 26, may be avoided.

Turning to the mechanism by which the edit session is controlled, the controller 25 of the dictation module 24 may be configured to send a session control command 41 instructing the document-specific keyboard handler 42 to start or stop reflecting the keyboard input 30 to the dictation module 24 for display on the scratchpad graphical interface 28, based on a set of predetermined rules 27. The session control command 41 may be sent from the session controller 25 of the dictation module via a document-specific text service module of a text services framework to the document-specific keyboard handler.

As one example, upon receiving the recognized speech text input 22 from the speech recognition module 16, the session controller 25 of the dictation module 24 may be configured to apply the predetermined rules 27 in the following manner. First, the session controller 25 may apply a predetermined rule 27 that specifies routing the keyboard input to the document if the document is text service framework unaware, as discussed above. The controller of the dictation module 24 may be configured to determine that the document 26 is text service framework unaware by referencing a first document identifier 50 associated with the document 26, and determining whether the document 26 is of a type that is text service framework unaware. A speech services unaware document is one that is not configured to interface with a text services framework interface such as Microsoft® Windows® Text Services Framework.

Alternatively or in addition, the session controller 25 may be configured to apply a predetermined rule 27 that specifies routing the keyboard input to the document 26 according to a user setting or a user command. The user setting may, for example, specify that the recognized speech text input 22 is not to be edited in an edit session via the scrapbook GUI 28, for one or more, or all, document types. This may be useful for programs that do not typically have a great deal of text editing associated with them, such as instant messenger applications. The user command may, for example, be a predetermined keystroke or keystroke combination that is interpreted by the scrapbook GUI as a user command. It will be appreciated that the user settings and user commands within predetermined rules 27 may be set by the user via voice commands if desired. In this manner, a user might toggle the scratchpad GUI on and off, for example, using a voice command during the speech recognition process.

Under some circumstances, less than all of the keyboard input 30 may be reflected by the document-specific keyboard handler 42, and thus the predetermined rules 27 may include a rule that specifies that a keystroke filter 60 is to be applied. In this case, the reflector 44 of the document-specific keyboard handler may implement a filter 60 that is configured to programmatically filter the keyboard input 30 while keyboard input 30 is being reflected, and to refrain from reflecting exempted keyboard input that is determined to match a predetermined filter parameter. Instead, the exempted keyboard input may be passed by the reflector 44 to the document 26. One application of such a filter 60 is that the filter 60 may be programmed to allow only arrow keys, for example, to be filtered out of the reflected stream, while letting other alphanumeric text to be reflected to the scratchpad GUI. This may be useful, for example, during a use case scenario in which the user is editing text in the scratchpad GUI 28, but desires to navigate document 26 using arrow keys. Of course, a wide variety of filter parameters may be implemented, to accommodate other use case scenarios. In this manner, it will be appreciated that during reflection, filter 60 may be programmed to enable users to access certain functionality of scratchpad GUI 28 via a first set of unfiltered keystrokes, while still being able to access other functionality of document 26 via a second set of filtered keystrokes.

Figure 2:
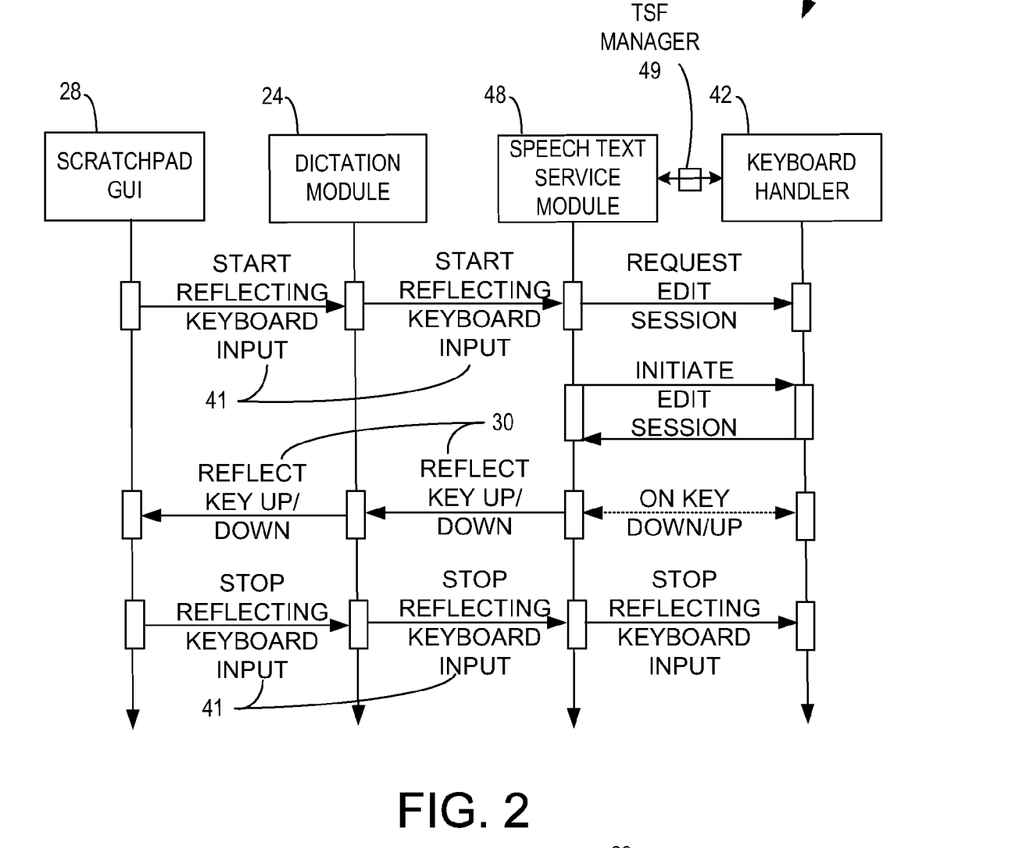
FIG. 2 is a diagram illustrating an example communications flow between various components of the multimodal input system of FIG. 1.

FIG. 2 illustrates an example communications diagram 200 of the multimodal input system of FIG. 1. As shown, the scratchpad GUI 28 is configured to send a session control command 41 to the dictation module 24 that it is ready to begin receiving reflected input. The dictation module 24 in turn, is configured to send a session control command 41 to the text service module 48 to start an edit session. The text service module 48 in turn requests that an edit session be initiated by the keyboard handler 42, which request may be sent via a text services framework manager 49 of the text services framework described above.

The keyboard handler 42 may be configured to initiate the edit session and begin reflecting keyboard input. During the edit session, upon detecting a key up or down message of keyboard input 30, the keyboard handler 42 is configured to reflect the detected key up/key down message of the keyboard input 30 back through the text service module 48 and dictation module 24 to the scratchpad GUI 28. Upon detecting the end of an edit session, the scratchpad GUI 28 may be configured to send a session control command 41 via the dictation module 24 and the text service module 48 to the keyboard handler 42, to thereby cause the keyboard handler 42 to stop reflecting keyboard input 30.

Figure 3:
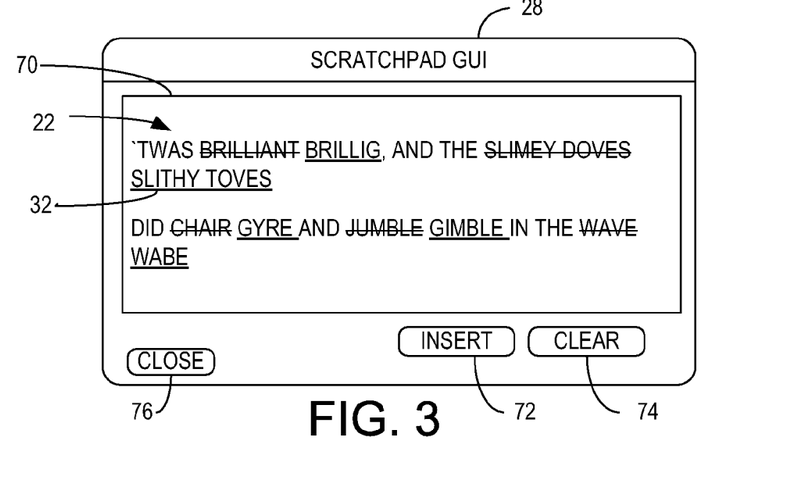
FIG. 3 illustrates an example of a scratchpad graphical user interface of the multimodal input system of FIG. 1.

FIG. 3 illustrates an example embodiment of a scratchpad GUI 28. As shown, the scratchpad GUI 28 may include an input pane 70 for displaying the recognized speech text input 22, and edits 32 thereto. An insert selector 72 may be provided, which is selectable to cause the edited speech text input 34 to be inserted into document 26, as described above. A clear selector 74 may be provided to enable a user to clear the input pane 70. A close selector 76 may be provided by which the user may end the edit session.

Figure 4:
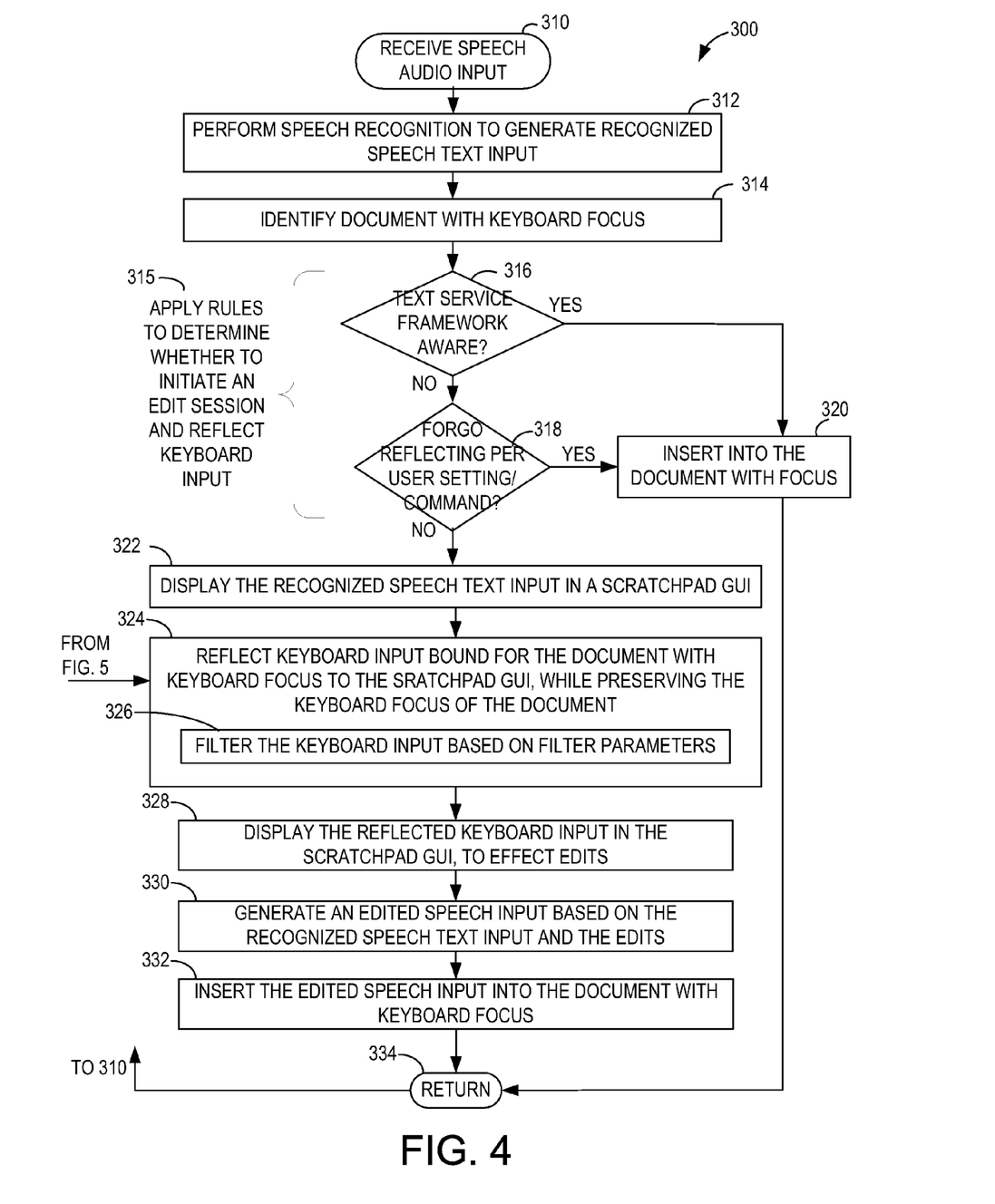
FIG. 4 is a flowchart of an embodiment of a method for multimodal input into an application program.

FIG. 4 is a flowchart illustrating an embodiment of a method 300 for multimodal input. It will be appreciated that method 300 may be implemented using the hardware and software components of the system described above, or via other suitable hardware and software components.

Method 300 may include, at 310, receiving speech audio input. At 312, the method includes performing speech recognition on speech audio input to thereby produce recognized speech text input for insertion into a document of an application program that has keyboard focus. At 314, the method includes identifying the document with keyboard focus.

At 315, prior to displaying the recognized speech text input in a scratchpad graphical user interface, the method may include applying a set of predetermined rules to determine that an edit session is to be initiated and keyboard input is to be reflected. Two example rules are illustrated at 316 and 318. At 316, the method includes identifying whether the document is text service framework aware (YES) or unaware (NO). If the document is text service framework aware (YES), the method proceeds to 320, and the recognized speech input is inserted into the document with focus. However, if it is determined that the document is text service framework unaware (NO), then the method proceeds to 318, where a second example rule may be applied to determine whether a user command or user setting specifies forgoing the edit session. If the method determines that a user command or user setting does not specify forgoing the edit session the method proceeds to 322, otherwise, the method proceeds to 320, where the recognized speech text input is directly inserted into the document with focus.

At 322, the method includes displaying the recognized speech text input in a scratchpad graphical user interface for editing the recognized speech text input. At 324, the method includes reflecting keyboard input bound for the document to the scratchpad graphical user interface, while preserving the keyboard focus of the document. As shown at 326, reflecting may include filtering the keyboard input while keyboard input is being reflected. The filtering may allow a first set of predetermined keystrokes to be reflected to the scratchpad graphical user interface, and may pass a second set of predetermined keystrokes to the document with keyboard focus, as described in detail above.

At 328, the method includes displaying the reflected keyboard input on the scratchpad graphical user interface, to thereby effect edits in the recognized speech text input. At 330, the method may include generating an edited speech input based on the recognized speech text input and the edits. At 332, the method may include inserting the edited speech input into the document with keyboard focus. As shown at 334, the method may return to 310, to receive additional speech audio input It will be appreciated that the steps illustrated in FIG. 4 may occur either at a dictation module as described above, or under command of such a dictation module. In contrast, the steps illustrated in FIG. 5, below, typically occur at one or more keyboard handlers that are assigned to process keyboard input.

Figure 5:
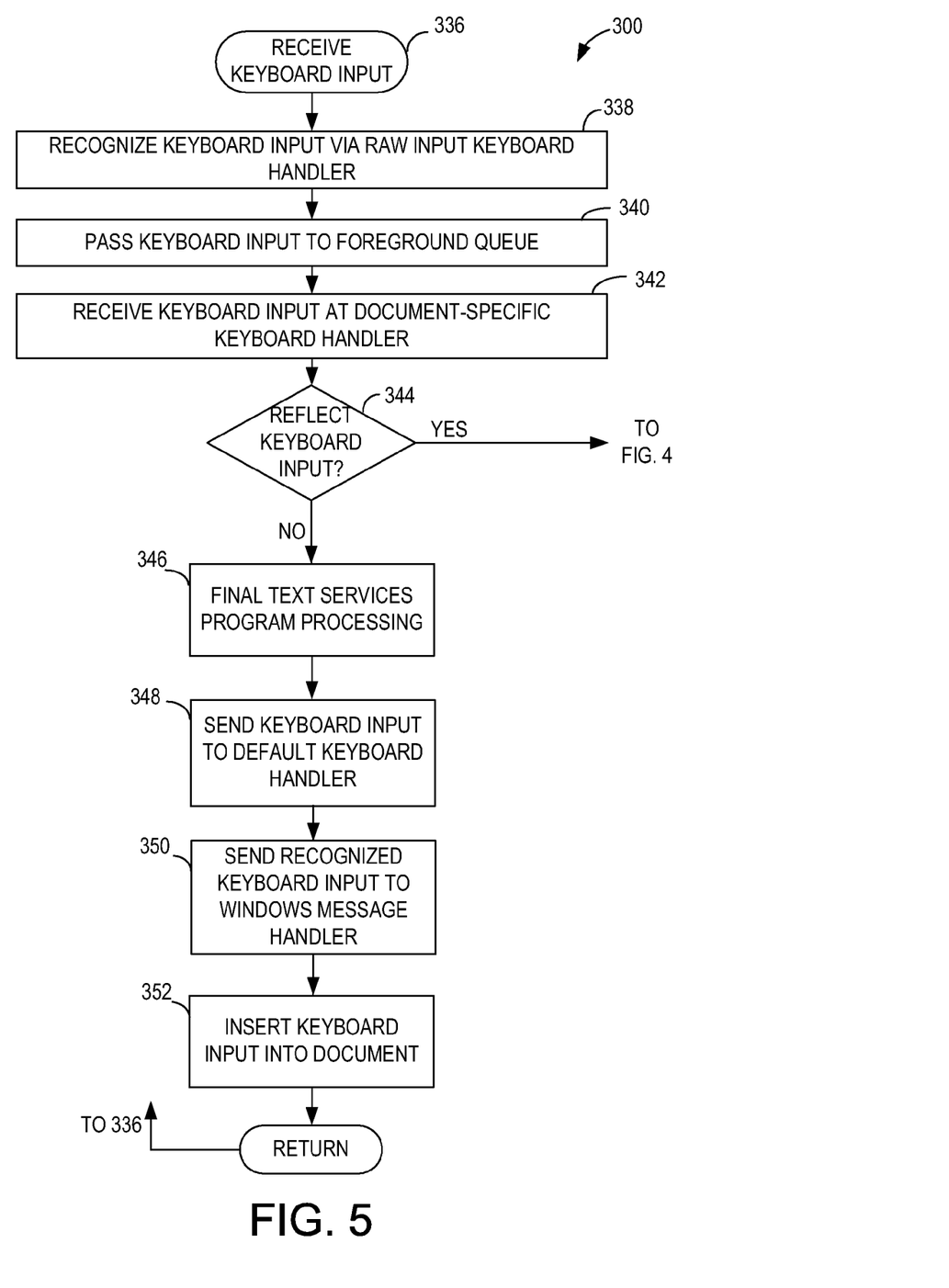
FIG. 5 is a flowchart of a branch of the method of FIG. 4, illustrating a keyboard input flow.

FIG. 5 illustrates a branch of the method 300, showing steps in a keyboard input flow of the method. At 336, the method may include receiving keyboard input from a keyboard associated with the computing device. At 338, the method includes recognizing keyboard input via a raw input keyboard handler. At 340, the method includes passing the keyboard input to a foreground queue, to be inserted into the document with focus.

At 342, the method may include receiving the keyboard input at a document specific keyboard handler, which may include a reflector for reflecting some or all of the keyboard input to a scratchpad GUI, as described above. At 344, the method may include determining whether to reflect keyboard input. This determination may be based upon factors such as whether a session control command has been received that requests keyboard input be reflected, and/or whether the keyboard handler has been requested to filter any keyboard input out of the reflected keyboard input, as described above. If the outcome of the determination at 344 is YES, then the method proceeds to step 324 in FIG. 4, to reflect keyboard input from the keyboard handler to the scratchpad graphical user interface. On the other hand, if the outcome at 344 is NO, then the method proceeds to perform final processing by text services framework on the keyboard input at 346, and to pass the keyboard input through a default keyboard handler at 348, and then a Windows® message handler at 350. At 352, the keyboard input is inserted into the document. The keyboard flow branch of the method then returns to step 336 of FIG. 4 for continued processing of keyboard input.

Further, it will be appreciated that performing speech recognition may further include producing correction information including recorded portions of speech audio input and/or alternate recognition candidate words or phrases for a selected span of speech audio input, and generating the edited speech input may further include presenting the recorded portions of speech audio input and/or alternate candidates to the user during the edit session via the scratchpad graphical user interface, to enable the user to appropriately make the edits in the recognized speech text input.

The above described systems and methods may be utilized to enable a user to efficiently input speech audio input for speech recognition, and edit the results of the speech text recognition via keyboard input, all without taking keyboard focus away from the document during the editing process, which can sometimes cause undesirable effects. Such systems and methods are particularly applicable to documents that are text service framework unaware, and which thus potentially include errors in speech recognition results.

It will be appreciated that the embodiments described herein may be implemented, for example, via computer-executable instructions or code, such as programs, stored on computer-readable storage media and executed by a computing device, such as a processor of server computing subsystem, for example. Generally, programs include routines, objects, components, data structures, and the like that perform particular tasks or implement particular abstract data types. As used herein, the term "program" may connote a single program or multiple programs acting in concert, and may be used to denote applications, services, or any other type or class of program. Likewise, the terms "computer" and "computing device" as used herein include any device that electronically executes one or more programs, including, but not limited to, personal computers, servers, laptop computers, hand-held devices, microprocessor-based programmable consumer electronics and/or appliances, etc.

It will be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A multimodal input system for use with an application program executed on a computing device, the system comprising:
a dictation module configured to receive a recognized speech text input for insertion into a document that has keyboard focus, the recognized speech text input including text recognized from speech audio input by a speech recognition module;
a scratchpad graphical user interface (GUI) configured to display the recognized speech text input, to receive keyboard input to effect edits in the recognized speech text input without changing a keyboard focus from the document in the application program, and to generate an edited speech input for insertion into the document; and
a document-specific keyboard handler including a reflector configured to selectively reflect keyboard input, received from a foreground queue and bound for the document, to the scratchpad GUI for editing of the recognized speech text input, wherein the reflector includes a filter that is configured to programmatically filter the keyboard input while keyboard input is being reflected, and to refrain from reflecting exempted keyboard input that is determined to match a predetermined filter parameter, and instead pass the exempted keyboard input to the document.

2. The multimodal input system of claim 1,
wherein the dictation module is further configured to receive a notification from a document-specific text service module of a text services framework, prior to receiving the recognized speech text input, which indicates that the document with which the document-specific text service module is associated has keyboard focus, and also which includes a first document identifier that identifies the document in focus.

3. The multimodal input system of claim 2,
wherein the document-specific text service module is configured to store a local copy of the first document identifier; and
wherein the dictation module is further configured to set a local keyboard focus by changing a value of the local copy of the first document identifier to be a second document identifier that is associated with the scratchpad GUI, thus informing the document-specific text service module that a scratchpad document of the scratchpad GUI has keyboard focus, without affecting the keyboard focus registered with other components of the text services framework of an operating system of the computing device.

4. The multimodal input system of claim 2, wherein the dictation module is further configured to send a session control command instructing the document-specific keyboard handler to start or stop reflecting the keyboard input to the dictation module for display on the scratchpad GUI, based on a set of predetermined rules.

5. The multimodal input system of claim 4, wherein the rules include routing the keyboard input to the document if the document is text service framework unaware.

6. The multimodal input system of claim 5, wherein the dictation module is configured to determine that the document is text service framework unaware by referencing the first document identifier associated with the document, and determining whether the document is of a type that is text service framework unaware.

7. The multimodal input system of claim 4, wherein the rules include routing the keyboard input to the document according to a user setting or a user command.

8. The multimodal input system of claim 7, wherein the user command is a voice enabled command received via speech audio input.

9. The multimodal input system of claim 4, wherein the session control command is sent from the dictation module via the document-specific text service module to the document-specific keyboard handler.

10. A method for multimodal input into an application program, comprising:
on a computing device,
performing speech recognition on speech audio input to thereby produce recognized speech text input for insertion into a document of an application program, the document having keyboard focus;

identifying the document as being text service framework unaware;

displaying the recognized speech text input in a scratchpad graphical user interface for editing the recognized speech text input;

selectively reflecting keyboard input bound for the document to the scratchpad graphical user interface to effect edits in the recognized speech text input, while preserving the keyboard focus of the document;

programmatically filtering the keyboard input while keyboard input is being reflected, to refrain from reflecting exempted keyboard input that is determined to match a predetermined filter parameter, and instead pass the exempted keyboard input to the document;

displaying the reflected keyboard input on the scratchpad graphical user interface, to thereby effect edits in the recognized speech text input; and displaying the exempted keyboard input in the document.

11. The method of claim 10, further comprising, generating an edited speech input based on the recognized speech text input and the edits; and inserting the edited speech input into the document with keyboard focus.

12. The method of claim 11, wherein performing speech recognition further includes producing correction information including recorded portions of speech audio input and/or alternate recognition candidate words or phrases for a selected span of speech audio input.

13. The method of claim 12, wherein generating the edited speech input further includes presenting the recorded portions of speech audio input and/or alternate recognition candidate words or phrases to a user during an edit session via the scratchpad graphical user interface, to enable the user to appropriately make the edits in the recognized speech text input.

14. The method of claim 11, further comprising, prior to displaying the recognized speech text input in the scratchpad graphical user interface, applying a set of predetermined rules to determine that an edit session is to be initiated.

15. The method of claim 14, wherein the predetermined rules include determining that a user command or user setting does not specify forgoing the edit session.

16. A method for multimodal input into an application program, comprising:

on a computing device, receiving recognized speech text input for insertion into a document of an application program, the document being text service framework unaware and having keyboard focus;

displaying the recognized speech text input in a scratchpad graphical user interface for editing the recognized speech text input;

selectively reflecting keyboard input bound for the document to the scratchpad graphical user interface to effect edits in the recognized speech text input, while preserving the keyboard focus of the document; and programmatically filtering the keyboard input while keyboard input is being reflected, to refrain from reflecting exempted keyboard input that is determined to match a predetermined filter parameter, and instead pass the exempted keyboard input to the document.

\* \* \* \* \*